(12) United States Patent
Ahn et al.

(10) Patent No.: US 9,315,596 B2
(45) Date of Patent: Apr. 19, 2016

(54) METHOD FOR PRODUCTION OF VINYL CHLORIDE-BASED POLYMER BY SUSPENSION POLYMERIZATION

(75) Inventors: Seong-Yong Ahn, Jeollabuk-do (KR); Kyung-Hyun Kim, Seoul (KR); Young-Suk Kim, Jeollanam-do (KR); Jong-Hun Cho, Jeollanam-do (KR); Chang-Ryang Jang, Jeollanam-do (KR)

(73) Assignee: LG Chem, Ltd. (KR)

( * ) Notice: Subject to any disclaimer, the term of this patent is extended or adjusted under 35 U.S.C. 154(b) by 1293 days.

(21) Appl. No.: 12/308,294

(22) PCT Filed: Feb. 9, 2007

(86) PCT No.: PCT/KR2007/000726
§ 371 (c)(1),
(2), (4) Date: Apr. 7, 2010

(87) PCT Pub. No.: WO2007/145416
PCT Pub. Date: Dec. 21, 2007

(65) Prior Publication Data
US 2010/0190946 A1    Jul. 29, 2010

(30) Foreign Application Priority Data

Jun. 12, 2006 (KR) .................. 10-2006-0052586

(51) Int. Cl.
*C08F 14/06* (2006.01)
*C08F 2/00* (2006.01)
*C08F 114/06* (2006.01)
*C08F 214/06* (2006.01)

(52) U.S. Cl.
CPC ............... *C08F 14/06* (2013.01); *C08F 2/001* (2013.01); *C08F 114/06* (2013.01); *C08F 214/06* (2013.01)

(58) Field of Classification Search
CPC ........ C08F 2/001; C08F 14/06; C08F 114/06; C08F 214/06
USPC ........................................ 526/78, 79, 80, 87
See application file for complete search history.

(56) References Cited

U.S. PATENT DOCUMENTS

| | | | |
|---|---|---|---|
| 2,345,659 A | 4/1944 | Downes | |
| 2,538,051 A | 1/1951 | Schick | |
| 4,269,954 A * | 5/1981 | Morningstar et al. | 526/62 |
| 4,381,361 A | 4/1983 | Hardt et al. | |
| 4,477,638 A * | 10/1984 | Reid | 526/84 |
| 4,515,927 A * | 5/1985 | Gaylord | 526/87 |
| 5,502,123 A * | 3/1996 | Hiyama et al. | 526/88 |
| 5,908,905 A | 6/1999 | Nakano et al. | |
| 2006/0149014 A1 | 7/2006 | Westmijze et al. | |

FOREIGN PATENT DOCUMENTS

| | | |
|---|---|---|
| JP | 59168008 | 9/1984 |
| JP | 10-045813 A | 2/1998 |
| JP | 10-265511 A2 | 10/1998 |
| WO | WO-00/31156 A1 | 6/2000 |

OTHER PUBLICATIONS

Product data sheet for Celvol 23/88, Mar. 2006.*
Dow Technical handbook for Methocel Cellulose Ethers, Sep. 2002.*
International Search Report issued on May 18, 2007 in connection with corresponding International Application No. PCT/KR2007/000599.
U.S. Appl. No. 12/310,425, Ahn, S. et al., filed Feb. 20, 2009.

* cited by examiner

*Primary Examiner* — Richard A Huhn
(74) *Attorney, Agent, or Firm* — Lerner, David, Littenberg, Krumholz & Mentlik, LLP

(57) ABSTRACT

The present invention provides a method of preparing vinyl chloride polymer having excellent processability and high bulk density by the separate stepwise additions of vinyl chloride monomer during suspension polymerization.

12 Claims, No Drawings

METHOD FOR PRODUCTION OF VINYL CHLORIDE-BASED POLYMER BY SUSPENSION POLYMERIZATION

CROSS REFERENCE TO RELATED APPLICATIONS

The present application is a national phase entry under 35 U.S.C. §371 of International Application No. PCT/KR2007/000726, filed Feb. 9, 2007, published in English, which claims the benefit of Korean Patent Application No. 10-2006-0052586, filed Jun. 12, 2006. The disclosures of all of said applications are incorporated by reference herein.

TECHNICAL FIELD

The present invention relates to a method of preparing vinyl chloride polymer having excellent processability, and more precisely, a method of preparing vinyl chloride polymer which is based on suspension polymerization of vinyl chloride monomer in the presence of a protective colloid auxiliary and a polymerization initiator, and characterized by the separate addition of vinyl chloride monomer at least two times when the polymerization conversion rate reaches 30~70%.

BACKGROUND ART

Owing to its excellent mechanical strength, weatherability and chemical resistance, vinyl chloride polymer has been widely used in various industrial fields including the production of pipe and construction materials. However, its moldability is not very good and needs to be improved.

In general, the moldability of vinyl chloride polymer depends on the characteristics of the vinyl chloride polymer particles used. Therefore, in order to increase productivity, bulk density, and internal porosity, the diameter and particle distribution of vinyl chloride polymer particles needs to be controlled along with the improvement of gelation characteristics, plasticizer absorptiveness and powder fluidity.

In particular, it is necessary to increase the bulk density of vinyl chloride polymer to improve productivity from extrusion molding, and the gelation melting rate must be accelerated to improve the processability of extrusion molding. However, when extrudate produced from extrusion molding is increased, fusion torque is increased. But, fusion torque needs to be low for gelation of vinyl chloride polymer. It is also necessary to reduce processing time in order to increase polymerization productivity; in particular it is preferred to reduce polymerization time or to increase productivity per unit polymerizer.

The conventional suspension polymerization produces vinyl chloride polymer either with a high bulk density or with a fast gelation melting rate, which is not good enough for extrusion molding. That is, vinyl chloride polymer produced by suspension polymerization exhibits high polymerization productivity but low bulk density, or low polymerization productivity but high bulk density, suggesting that the effect of the polymer is in doubt because of its lowered polymerization productivity, smaller pores inside the polymer particles, or increased free polymer particles, even if vinyl chloride polymer with a high bulk density is produced.

As an alternative to improve the molding processability of vinyl chloride polymer, it has been proposed that 0.01~0.2 weight part of one or more partially saponificated polyvinyl alcohols having 65 mol % hydration and an average degree of polymerization of 500~4000 is added to 100 weight part of vinyl chloride monomer as a dispersion stabilizer for polymerization. This is followed by suspension polymerization, and then the reaction mixture is cooled down in a reflux condenser when the conversion rate of the vinyl chloride monomer reaches 3~40%, during which a polyvinyl alcohol having at least 97 mol % hydration and an average degree of polymerization of at least 1500 is additionally added. However, the resultant vinyl chloride polymer of this proposed method has the problem of decreased melting properties because of the addition of a dispersion stabilizer having 90 mol % hydration, even though the bulk density of vinyl chloride polymer can be increased by this method.

There are two methods to improve the melting properties of a resin; one is the combination of two different initiators having different half-lives and the other is to improve the processability of a resin by regulating the polymerization degree distribution by changing the PVC polymerization temperature. Particularly, polymerization is performed in two steps; in step 1, polymerization is performed at a set temperature until the conversion rate reaches 50 weight %, and in step 2, polymerization of vinyl chloride monomer is performed at a temperature 5~15° C. higher than the primary polymerization temperature. According to the above method, vinyl chloride having improved processability and high bulk density can be obtained, but productivity is reduced because of the longer time for the temperature change between the primary polymerization to the secondary polymerization. The polymerization temperature changes might result in side effects such as excessive coloring caused by sub-reactions between a reactant such as vinyl chloride monomer and an additive. Therefore, to compensate for such side effects by the sub-reactions, another additive such as a heat stabilizer has to be added which increases the production cost.

Therefore, a novel method of preparing vinyl chloride polymer with high bulk density is required, and at the same time having improved polymerization productivity.

DISCLOSURE OF INVENTION

Technical Problem

It is an object of the present invention, in order to solve the above problems, to provide a method of preparing vinyl chloride polymer having excellent processability and at the same time high bulk density and polymerization productivity.

Technical Solution

To achieve the above object, the present invention provides a method of preparing vinyl chloride polymer in which vinyl chloride monomer is suspension-polymerized and the vinyl chloride monomer is separately added at least two times when the polymerization conversion rate reaches 30~70%.

According to an exemplary embodiment of the present invention, the method of preparing vinyl chloride polymer preferably comprises the following steps: the addition of vinyl chloride monomer when the polymerization conversion rate reaches 30~40%; and the additional supplementation of vinyl chloride monomer when the polymerization conversion rate reaches 60~70%.

The present invention is described in detail hereinafter.

The present invention provides a method of preparing vinyl chloride polymer having excellent processability. This method characteristically includes at least two separate additions of vinyl chloride monomer when the polymerization conversion rate reaches 30~70%, so that it can produce vinyl chloride having high bulk density and excellent processability, compared with the conventional method.

Particularly, the present invention provides a method of preparing vinyl chloride polymer by suspension polymerization of vinyl chloride monomer in the presence of a protective colloid auxiliary and a polymerization initiator, in which vinyl chloride monomer is added separately at least twice while the polymerization conversion rate is 30~70%; more preferably, once when the polymerization conversion rate is 30~40% and once again when the polymerization conversion rate is 60~70%.

If vinyl chloride monomer is added before the polymerization conversion rate reaches 30%, the productivity per batch will not be improved. On the other hand, if vinyl chloride is added when the polymerization conversion rate is over 70%, the level of micro particles will increase which interrupts the increase of bulk density, early coloring property will be poor, and the polymerization time will be longer, resulting in the decrease of polymerization productivity. If vinyl chloride monomer is added when the polymerization conversion rate is 40~60%, the bulk density will not be increased enough.

Herein, the separate addition of vinyl chloride when the polymerization conversion rate is 30~40% and 60~70% means that the beginning and the completion of the first addition is done when the polymerization conversion rate is 30~40% and the beginning and the completion of the second addition is done when the polymerization conversion rate is 60~70%. The addition of vinyl chloride monomer must be done this way, otherwise the production of vinyl chloride polymer with a high bulk density and productivity is not guaranteed. When the polymerization conversion rate reaches 30~40%, unity/redispersion occurs most vigorously. Thus, if vinyl chloride monomer is additionally supplemented during that period, the added vinyl chloride monomer will be stably converted into vinyl chloride polymer, thereby increasing the productivity per batch. When the polymerization conversion rate reaches 60~70%, which means internal porous formation is satisfactorily completed, it is possible to regulate the internal morphology of the polymer particle; therefore, the additional supplementation of vinyl chloride monomer during this period results in vinyl chloride polymer with a high bulk density owing to the inside of the polymer particle filling, based on monomer diffusion.

In the preparation method of the present invention, the amount of vinyl chloride monomer that should be added when the polymerization conversion rate is 30~40% is preferably 10~30 weight part for 100 weight part of the total amount of monomer, and more preferably 15~25 weight part.

The amount of vinyl chloride monomer that should be added when the polymerization conversion rate is 60~70% is 10~30 weight part for 100 weight part of the total amount of monomer, and more preferably 15~25 weight part.

If the amount of vinyl chloride monomer is less than 10 weight part, polymerization productivity will not be increased enough. On the other hand, if the content of vinyl chloride monomer is more than 30 weight part, polymerization stability will be at risk because the monomer exceeds the effective volume of the reactor.

The protective colloid auxiliary used in the present invention is not limited, and any protective colloid auxiliary that is acceptable in this field can be used, but it is preferably selected from a group consisting of vinyl alcohol resin, cellulose and unsaturated organic acid polymer.

The vinyl alcohol resin herein preferably has 30~90 weight % hydrolysis and a 4% solution viscosity of 10~60 cps at room temperature.

The cellulose herein preferably has 3~20 weight % hydroxypropyl groups and a 2% solution viscosity of 10~2000 cps at room temperature.

The unsaturated organic acid polymer herein is either a single compound or a complex of at least two compounds selected from a group consisting of acrylic acid polymer, methacrylic acid polymer, itaconic acid polymer, fumaric acid polymer, maleic acid polymer, succinic acid polymer and gelatin, but is not always limited thereto and any unsaturated organic acid polymer that is acceptable in this field can be used.

The preferable content of the protective colloid, according to the method of the present invention, is 0.03~5 weight part for 100 weight part of the total amount of monomer, and 0.05~2.5 weight part is more preferred.

If the content of the protective colloid is less than 0.03 weight part, coarse particles will be formed which causes a fish eye problem. On the other hand, if the content is more than 5 weight part, the number of micro-particles will increase which causes a problem in early coloring.

The polymerization initiator used in the present invention is a single compound or a combination of at least two compounds selected from a group consisting of diacylperoxides, peroxydicarbonates, peroxyesters, azo compounds and sulfates.

The diacylperoxide can be one or more compounds selected from a group consisting of dicumyl peroxide, dipentyl peroxide, di-3,5,5-trimethyl hexanoyl peroxide and dilauryl peroxide, but is not always limited thereto and any additional polymerization initiator that is acceptable in this field can be included.

The peroxydicarbonate can be one or more compounds selected from a group consisting of diisopropylperoxydicarbonate, di-sec-butylperoxydicarbonate and di-2-ethylhexylperoxydicarbonate, but is not always limited thereto and any additional polymerization initiator that is acceptable in this field can be included.

The peroxyester can be t-butylperoxypivalate or t-butylperoxyneodecanoate, but is not always limited thereto and any additional polymerization initiator that is acceptable in this field can be included.

The azo compound can be azobis-2,4-dimethylvaleronitrile, but is not always limited thereto and any additional polymerization initiator that is acceptable in this field can be included.

The sulfate can be potassium persulfate or ammonium persulfate, but is not always limited thereto and any additional polymerization initiator that is acceptable in this field can be included.

The preferable content of a polymerization initiator, according to the method of the present invention, is 0.02~0.2 weight part for 100 weight part of the total amount of monomer, and 0.04~0.12 weight part is more preferred.

If the content of the initiator is less than 0.02 weight part, the reaction time will be longer and thus productivity will be decreased. On the contrary, if the content of the initiator is more than 0.2 weight part, the initiator will not be completely consumed during the polymerization and remain in a final resin product, thereby reducing thermostability and qualities of the product including color expression.

In the present invention, an additive such as a polymerization regulator, a chain transfer agent, a pH regulator, a cross-linking agent, an antistatic agent, a scale inhibitor, and a surfactant can be added separately or continuously to the polymerization system before, after, or during the polymerization.

The antioxidant of the present invention is one or more compounds selected from a group consisting of phenol based antioxidants, amine based antioxidants, sulfur based antioxidants and phosphate based antioxidants, but is not always limited thereto and any additional antioxidant acceptable in this field can be included.

The phenol based antioxidant can be one or more compounds selected from a group consisting of triethylene glycol-bis-[3-(3-t-butyl-methyl-4-hydroxy phenyl)propionate], hydroquinone, p-methoxy phenol, t-butylhydroxyanisole, n-octadecyl-3-(4-hydroxy 3,5-di-t-butyl phenyl)propionate, 2,5-di-t-butyl hydroquinone, 4,4-butylidenebis(3-methyl-6-t-butyl phenol), t-butyl catechol, 4,4-thio bis(6-t-butyl-m-cresol), tocopherol, non dihydro guaretic acid, 2,4,6-tri-t-butyl phenol, cyclohexyl phenol, 2,2'-methylene-bis(4-methyl-6-t-butyl phenol), 4,4'-isopropylidene bisphenol, 4,4'-butylene-bis(3-methyl-6-t-butyl phenol), 1,1,3-tris(2-methyl-4-hydroxy-5-t-butyl-phenol)butane, 1,3,5-tris-methyl-2,4,6-tris(3,5-di-t-butyl-4-hydroxybenzyl)benzene, tetrakis[methylene-3(3,5-di-t-butyl-4-hydroxy-phenol) propionate]methane, tris(3,5-di-t-butyl-hydroxyphenyl) isocyanate, 4,4'-thiobis(3-methyl-6-t-butylphenol), tris[β-(3, 5-di-t-butyl-4-hydroxy phenyl) propionyl-oxyethyl] isocyanate, and 2,2'-thiobis(4-methyl-6-t-butylphenol).

The amine based antioxidant can be N,N-diphenyl-p-phenylene diamine or 4,4-bis(dimethyl benzyl)diphenyl amine.

The sulfur based antioxidant can be one or more compounds selected from a group consisting of dodecyl mercaptan, 1,3-diphenyl-2-thiol, dilaurylthiodipropionate, and distearylthiodipropionate.

The phosphate based antioxidant can be one or more compounds selected from a group consisting of triphenylphosphite, diphenyldecylphosphite, phenylisodecylphosphite, tri(nonylphenyl)phosphite, and trilauryltrithiophosphite.

The method of preparing vinyl chloride polymer of the present invention can additionally include the step of adding a comonomer. The vinyl chloride polymer herein is not only a resin composed of vinyl chloride monomers alone, but also a copolymer produced by using vinyl chloride monomer as a main component and another vinyl monomer suitable for copolymerization with the vinyl chloride monomer (the content of vinyl chloride monomer in the total composition of the copolymer is at least 50 weight %).

The monomer suitable for copolymerization can be one or more compounds selected from a group consisting of olefin compounds, vinyl esters, unsaturated nitriles, vinyl alkyl ethers, unsaturated fatty acids and unsaturated fatty acid anhydrides, but is not always limited thereto.

The preferable content of the comonomer is up to 100 weight part for 100 weight part of the total amount of vinyl chloride monomer.

The polymerization-temperature of the present invention depends on the kind of polymerization initiator, polymerization method, presence or absence of a polymerization regulator, and the target degree of polymerization. In general, the polymerization temperature determines the polymerization degree of vinyl chloride polymer, and the polymerization degree of vinyl chloride polymer is a major factor affecting the processing conditions and quality of a product. Thus, the polymerization temperature has to be carefully determined.

According to the present invention, the polymerization temperature of vinyl chloride polymer is preferably 30~80° C., and more preferably 47~67° C.

In the present invention, an additive such as a polymerization regulator, a chain transfer agent, a pH regulator, a crosslinking agent, an antistatic agent, a scale inhibitor, and a surfactant can be added separately or continuously to the polymerization system before, after, or during the polymerization.

The shape of a stirring apparatus, for example a stirrer and a baffle, is not limited and any general stirring apparatus used for the conventional suspension polymerization of vinyl chloride monomer can be used. For example, a paddle type, a pitched paddle type, a bloomers gin type, powder feeder type, a turbine type and a propeller type can be used as a stirring blade, or several stirring blades can be used together. The baffle may be a board type, a cylinder type, a D type, a loop type and a finger type.

The method of preparing vinyl chloride polymer of the present invention is distinguished from the conventional method by producing vinyl chloride polymer having excellent processability and high polymerization productivity. Therefore, the final vinyl chloride polymer produced by the method of the present invention has significantly improved fusion time and extrusion amount, compared with the conventional method.

BEST MODE FOR CARRYING OUT THE INVENTION

Practical and presently preferred embodiments of the present invention are illustrated as shown in the following examples.

However, it will be appreciated that those skilled in the art, on consideration of this disclosure, may make modifications and improvements within the spirit and scope of the present invention.

Example 1

To a 1 m³ reactor equipped with a reflux condenser was added 390 kg of deionized water, 130 g of di-2-ethylhexylperoxydicarbonate, 20 g of dilaurylperoxide, and 200 g of polyvinylalcohol having 80% hydration and a 4% solution viscosity of 30 cps at room temperature, which was made vacuous. To the mixture was added 300 kg of vinyl chloride monomer and the primary reaction temperature was raised to 57° C., at which temperature the entire polymerization was performed. When the polymerization conversion rate reached 30% and 60%, 60 kg of vinyl chloride monomer was added. When the pressure of the reactor reached 6.0 kg/cm², 60 g of triethylene glycol-bis-[3-(3-t-butyl-methyl-4-hydroxyphenyl)propionate] was added as an antioxidant. Non-reacted monomers were collected and the polymer slurry was recovered from the reactor. The obtained slurry was dried with a fluidized-bed dryer to give vinyl chloride polymer.

Example 2

Polymerization was performed in the same manner as described in Example 1, except that 60 kg of vinyl chloride monomer was additionally added to the reactor when the polymerization conversion rate reached 30% and 65%.

Example 3

Polymerization was performed in the same manner as described in Example 1, except that 60 kg of vinyl chloride monomer was additionally added to the reactor when the polymerization conversion rate reached 30% and 70%.

Example 4

Polymerization was performed in the same manner as described in Example 1, except that 60 kg of vinyl chloride monomer was additionally added to the reactor when polymerization conversion rate reached 35% and 60%.

Example 5

Polymerization was performed in the same manner as described in Example 1, except that 60 kg of vinyl chloride monomer was additionally added to the reactor when polymerization conversion rate reached 35% and 65%.

Example 6

Polymerization was performed in the same manner as described in Example 1, except that 60 kg of vinyl chloride monomer was additionally added to the reactor when the polymerization conversion rate reached 35% and 70%.

Example 7

Polymerization was performed in the same manner as described in Example 1, except that 60 kg of vinyl chloride monomer was additionally added to the reactor when the polymerization conversion rate reached 40% and 65%.

Example 8

Polymerization was performed in the same manner as described in Example 1, except that 60 kg of vinyl chloride monomer was additionally added to the reactor when the polymerization conversion rate reached 40% and 65%.

Example 9

Polymerization was performed in the same manner as described in Example 1, except that 60 kg of vinyl chloride monomer was additionally added to the reactor when the polymerization conversion rate reached 40% and 70%.

The experimental conditions, basic physical properties and processed properties measured in Examples 1~9 are shown in Table 1.

The evaluation of properties was performed as follows.

Polymerization Productivity

PVE polymer production per batch and per unit time was measured.

Bulk Density

Bulk density was measured by JIS K-6721.

Polymerization Degree

Polymerization degree was measured by ASTM D1243-79.

Mean Particle Diameter

Mean particle diameter was measured by ASTM D1705.

Coloring Characteristics

To 100 weight part of the obtained polymer were added 1 weight part of a Sn-based stabilizer, 0.5 weight part of a Pb-based stabilizer, 1.5 weight part of a stabilizer, and 45 weight part of a plasticizer, followed by mixing for 5 minutes at 150° C., and rolled to give a sheet. The obtained sheet was cut and folded, followed by press molding to give a pressed sheet. The sheet was observed with the naked eye and evaluated by the below standard.

⊙: considering Comparative Example 1 as a standard, this level indicates the similar or equal coloring to the Comparative Example 1 and no problem in practical use.

○: considering Comparative Example 1 as a standard, this level indicates lower coloring but no problem in practical use.

X: considering Comparative Example 1 as a standard, this level indicates poor coloring and has a problem in practical use.

Thermostability

The roll sheet prepared to measure the primary coloring characteristics was cut into 250 mm×20 mm sections, which were put in a 190° C. master oven. The sheet proceeded at 3 mm/min and the time consumed until the color changed to black was measured. This time was set up as a standard for the evaluation of thermostability.

Fusion Time

To 100 weight part of vinyl chloride polymer were added 3 weight part of basic lead lactate and 1 weight part of stearate. 60 g of the mixture was put in a mixer made by Brabender, the temperature of the chamber was set at 185° C., and the roller was set at 60 rpm. The time to reach maximum torque was measured.

Fusion Torque

Fusion torque was determined by the highest torque during fusion.

TABLE 1

| List | Unit | Example 1 | Example 2 | Example 3 | Example 4 | Example 5 |
|---|---|---|---|---|---|---|
| Polymerization time | Min | 325 | 328 | 329 | 326 | 330 |
| Polymerization production | Kg | 316 | 314 | 312 | 314 | 313 |
| Production per unit time | Kg/day | 1400 | 1378 | 1365 | 1386 | 1365 |
| | Kg/year | 511044 | 503166 | 498441 | 506252 | 498524 |
| | MT/year | 511 | 503 | 498 | 506 | 499 |
| Bulk density | g/cc | 0.574 | 0.576 | 0.577 | 0.573 | 0.574 |
| Polymerization degree | | 1020 | 1020 | 1020 | 1020 | 1020 |
| Mean diameter | Mm | 167 | 166 | 167 | 166 | 164 |
| Thermostability | Min | 59 | 59 | 58 | 59 | 58 |
| Coloring | | ○ | ○ | ○ | ○ | ○ |
| Fusion time | Sec | 105 | 107 | 106 | 106 | 103 |
| Fusion torq | Nm | 37.6 | 37.6 | 37.8 | 37.6 | 37.5 |
| Extrusion amount | g/min | 42.0 | 42.2 | 42.1 | 41.7 | 41.9 |

TABLE 1-continued

| List | Unit | Example 6 | Example 7 | Example 8 | Example 9 | Average |
|---|---|---|---|---|---|---|
| Polymerization time | Min | 332 | 327 | 331 | 333 | 329 |
| Polymerization production | Kg | 310 | 313 | 310 | 307 | 312 |
| Production per unit time | Kg/day | 1344 | 1378 | 1348 | 1327 | 1366 |
| | Kg/year | 490771 | 503097 | 492254 | 484562 | 498769 |
| | MT/year | 491 | 503 | 492 | 485 | 499 |
| Bulk density | g/cc | 0.575 | 0.571 | 0.572 | 0.574 | 0.574 |
| Polymerization degree | | 1020 | 1020 | 1020 | 1020 | 1020 |
| Mean diameter | Mm | 166 | 165 | 166 | 166 | 166 |
| Thermostability | Min | 58 | 59 | 58 | 57 | 58 |
| Coloring | | ○ | ○ | ○ | ○ | ○ |
| Fusion time | Sec | 104 | 105 | 107 | 104 | 105 |
| Fusion torq | Nm | 37.6 | 37.7 | 37.7 | 37.9 | 37.7 |
| Extrusion amount | g/min | 42.0 | 42.0 | 41.8 | 42.1 | 42.0 |

Polymerization production per unit time, bulk density, polymerization degree, mean particle diameter, thermo-stability, coloring characteristics, fusion time, fusion torque and extrusion amount were all similar among polymers in Examples 1~9.

Experiments were performed with modifications to the amount and time vinyl chloride monomer was added, as described in the following Comparative Examples.

Comparative Example 1

Polymerization was performed in the same manner as described in Example 1, except that 15 kg of vinyl chloride monomer was additionally added to the reactor when the polymerization conversion rate reached 35% and 65%.

Comparative Example 2

Polymerization was performed in the same manner as described in Example 1, except that 60 kg of vinyl chloride monomer was additionally added to the reactor only when the polymerization conversion rate reached 75%.

Comparative Example 3

Polymerization was performed in the same manner as described in Example 1, except that 60 kg of vinyl chloride monomer was additionally added to the reactor only when the polymerization conversion rate reached 35%.

Comparative Example 4

Polymerization was performed in the same manner as described in Example 1, except that 60 kg of vinyl chloride monomer was additionally added to the reactor only when the polymerization conversion rate reached 65%.

Comparative Example 5

Polymerization was performed in the same manner as described in Example 1, except that 60 kg of vinyl chloride monomer was additionally added to the reactor only when the polymerization conversion rate reached 45%.

Comparative Example 6

Polymerization was performed in the same manner as described in Example 1, except that the total amount of vinyl chloride monomer was added at the beginning, the polymerization temperature was raised to 57° C. and maintained until the polymerization was terminated, and an antioxidant was added when the pressure of the reactor reached 6.0 kg/cm$^2$. The physical properties of the prepared polymer were measured.

The precise experimental conditions, basic properties and processed properties of the polymers of Comparative Examples 1~6 are shown in Table 2.

TABLE 2

| List | Unit | Comparative Example 1 | Comparative Example 2 | Comparative Example 3 | Comparative Example 4 | Comparative Example 5 | Comparative Example 6 |
|---|---|---|---|---|---|---|---|
| Polymerization time | min | 315 | 340 | 310 | 320 | 315 | 300 |
| Polymerization production | kg | 269 | 267 | 298 | 274 | 284 | 255 |
| Production per unit time | kg/day | 1230 | 1131 | 1384 | 1233 | 1298 | 1224 |
| | kg/year | 448846 | 412751 | 505254 | 450045 | 473874 | 446760 |
| | MT/year | 449 | 413 | 505 | 450 | 474 | 447 |
| Bulk density | g/cc | 0.535 | 0.528 | 0.532 | 0.553 | 0.540 | 0.524 |
| Polymerization degree | | 1020 | 1020 | 1020 | 1020 | 1020 | 1020 |

TABLE 2-continued

| List | Unit | Comparative Example 1 | Comparative Example 2 | Comparative Example 3 | Comparative Example 4 | Comparative Example 5 | Comparative Example 6 |
|---|---|---|---|---|---|---|---|
| Mean diameter | μm | 163 | 166 | 165 | 166 | 166 | 161 |
| Thermostability | min | 61 | 55 | 60 | 58 | 58 | 60 |
| Coloring |  | ◎ | X | ◎ | ○ | ○ | ◎ |
| Fusion time | sec | 102 | 104 | 110 | 108 | 111 | 115 |
| Fusion torq | Nm | 37.5 | 38.0 | 37.8 | 37.6 | 37.7 | 38.1 |
| Extrusion amount | g/min | 38 | 37 | 37.5 | 40 | 39 | 37 |

The polymers prepared in the examples exhibited higher bulk density and significantly increased extrusion amount, compared with those in the comparative examples. In Comparative Example 1, the amount of vinyl chloride monomer was too small to be effective. In Comparative Example 2, the time of vinyl chloride monomer addition was too late to increase the bulk density and improve early coloring characteristics, and the late addition also prolonged the reaction time which lowered polymerization productivity. In Comparative Example 3, vinyl chloride monomer was additionally added once when the polymerization conversion rate reached 35%. In that case, polymerization productivity was increased but bulk density was not increased by much. In Comparative Example 4, vinyl chloride monomer was additionally added once when the polymerization conversion rate reached 65%. As a result, the bulk density was increased but productivity was not. In Comparative Example 5, vinyl chloride monomer was additionally added once when the polymerization conversion rate reached 45%. As a result, neither the bulk density nor polymerization productivity was increased.

INDUSTRIAL APPLICABILITY

As explained hereinbefore, vinyl chloride polymer with excellent processability and high bulk density can be produced by the preparation method of the present invention.

The vinyl chloride polymer prepared by the method of the present invention was tested for processability by measuring fusion time and extrusion amount. As a result, the processability of vinyl chloride polymer and extrusion amount per unit time were significantly improved.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the present invention as set forth in the appended claims.

The invention claimed is:

1. A method of preparing vinyl chloride polymer comprising:
   suspension-polymerizing vinyl chloride monomer in the presence of a protective colloid auxiliary, a polymerization initiator at a polymerization temperature,
   introducing additional vinyl chloride monomer
   (a) when the polymerization conversion rate reaches from 30 to 40%; and
   (b) when the polymerization conversion rate reaches from 60 to 70%,
   suspension-polymerizing the additional vinyl chloride monomer at the polymerization temperature, and
   adding one or more antioxidants selected from a group consisting of a phenol based antioxidant, an amine based antioxidant, a sulfur based antioxidant and a phosphate based antioxidant when the pressure of a reactor reaches 6.0 kg/cm$^2$, to complete the suspension-polymerizing,
   wherein the additional vinyl chloride monomer is not introduced when the polymerization conversion rate is between 40 to 60%,
   wherein the amount of the additional vinyl chloride monomer added when the polymerization conversion rate reaches between 30 and 40% is from 15 to 25 weight part for 100 weight part of the total amount of the monomer;
   wherein the amount of the additional vinyl chloride monomer added when the polymerization conversion rates reaches between 60 to 70% is from 15 to 25 weight part for 100 weight part of the total amount of the monomer;
   wherein the protective colloid auxiliary is present in an amount of between 0.05 and 2.5 weight part for 100 weight part of the total amount of the monomer, and
   wherein the polymerization initiator is present in an amount of between 0.02 and 0.2 weight part for 100 weight part of the total amount of the monomer.

2. The method of preparing vinyl chloride polymer, according to claim 1, wherein the protective colloid auxiliary is one or more compounds selected from a group consisting of a vinyl alcohol resin, cellulose and an unsaturated organic acid polymer.

3. The method of preparing vinyl chloride polymer according to claim 2, wherein the vinyl alcohol resin has from 30 to 90 weight % hydrolysis and a 4% solution viscosity of from 10 to 60 cps at room temperature.

4. The method of preparing vinyl chloride polymer according to claim 2, wherein the cellulose has from 3 to 20 weight % hydroxypropyl groups and a 2% solution viscosity of from 10 to 20,000 cps at room temperature.

5. The method of preparing vinyl chloride polymer according to claim 2, wherein the unsaturated organic acid polymer is a single compound or a combination of at least two compounds selected from a group consisting of an acrylic acid polymer, a methacrylic acid polymer, an itaconic acid polymer, a fumaric acid polymer, a maleic acid polymer, a succinic acid polymer, and gelatin.

6. The method of preparing vinyl chloride polymer according to claim 1, wherein the polymerization initiator is a single compound or a combination of at least two compounds selected from a group consisting of diacylperoxides, peroxydicarbonates, peroxyesters, azo compounds and sulfates.

7. The method of preparing vinyl chloride polymer according to claim 1, wherein the polymerization initiator is present in an amount of between 0.04 and 0.12 weight part for 100 weight part of the total amount of monomer.

8. The method of preparing vinyl chloride polymer according to claim 1, further comprising adding a comonomer in an amount of up to 100 weight part for 100 weight part of the total amount of vinyl chloride monomer.

9. The method of preparing vinyl chloride polymer according to claim 8, wherein the comonomer is one or more compounds selected from a group consisting of olefin compounds, vinyl esters, unsaturated nitriles, vinyl alkyl ethers, unsaturated fatty acids, and unsaturated fatty acid anhydrides.

10. The method of preparing vinyl chloride polymer according to claim 1, wherein the polymerization temperature is between 30 and 80° C.

11. The method of preparing vinyl chloride polymer according to claim 1, wherein the polymerization temperature is between 47 and 67° C.

12. The method of claim 1, wherein the bulk density of the vinyl chloride polymer is from 0.571 to 0.577 g/cc.

* * * * *